Dec. 18, 1956  B. H. DAVIS  2,774,107
EXTRUSION APPARATUS
Filed Oct. 15, 1954.  2 Sheets-Sheet 1

INVENTOR.
Benjamin H. Davis
BY
Steward & Sprague
ATTORNEYS

Dec. 18, 1956 B. H. DAVIS 2,774,107
EXTRUSION APPARATUS
Filed Oct. 15, 1954 2 Sheets-Sheet 2

INVENTOR.
Benjamin H. Davis
BY
Stevens + Sprigel
ATTORNEYS

United States Patent Office 2,774,107
Patented Dec. 18, 1956

2,774,107

EXTRUSION APPARATUS

Benjamin H. Davis, Noank, Conn., assignor to The Standard Machinery Company, Mystic, Conn., a corporation of Connecticut Application October 15, 1954, Serial No. 462,537

7 Claims. (Cl. 18—12)

This invention relates to extrusion apparatus in general, and to temperature controls thereof in particular.

It is common knowledge that major emphasis has been placed in existing extrusion apparatus on heating the extrusion cylinder, while cooling of the same has been considered as being of secondary importance. On the other hand, experience has taught that the cylinders of extrusion apparatus in which rubber and plastics are worked at recently developed speeds inevitably require very considerable external cooling and not so much, if any, external heating, except during the initial warm-up of the apparatus preceding action extrusion operations of the same.

It is the primary aim and object of the present invention to provide extrusion apparatus which meets the modern requirements of externally regulating the temperature of the extrusion cylinder, and especially achieve the requisite extensive cooling of the latter, with a minimum of purchased temperature-varying medium or media, without in the least interfering with the expected performance of modern apparatus of this type as to operating speed, uniformity of operation, accuracy and response of temperature regulation, and ready adaptability to extrudable materials of different heat requirements for their extrusion.

It is another object of the present invention to provide extrusion apparatus with separate heating means and cooling means which are arranged in most direct and optimum heat-exchange relation with the inner surface of the extrusion cylinder and also with each other, thereby to achieve most immediate and maximum temperature response of the inner cylinder surface to either means and also a most effective and quick temperature-modulating effect by either means upon the other and upon the inner cylinder surface and, hence, most accurate and easily regulatable control over the cylinder temperature with a minimum of purchased temperature-varying medium.

It is a further object of the present invention to provide extrusion apparatus in which the aforementioned heating means are embedded in a surrounding jacket on the customry cylinder or liner in fairly close proximity thereto for optimum heat-exchange relation therewith, and the cooling is effected by atmospheric air passing upwardly around the jacket and in intimate heat-exchange relation with a multitude of external cooling ribs on the latter, through a space confined in a cover around the jacket and having throughout the length of the latter an air inlet port and an air outlet port at the bottom and top, respectively, thereby to achieve with this structure the aforementioned accurate and easily regulatable control over the cylinder temperature with a minimum of purchased heating medium and with non-purchased cooling air of any volume required for any operation of the apparatus.

Another object of the present invention is to provide extrusion apparatus in which the aforementioned cover around the jacket is spaced outwardly throughout from the external cooling ribs on the latter, thereby to have only the air in the aforementiond space in direct heat-exchange relation with the cooling ribs, and permit the passage through this space of atmospheric air of sufficiently large volume per time unit effectively to cool the jacket and cylinder and carry off most of the heat therefrom under any and all operating conditions of the apparatus without raising the temperature of the cover sufficiently to be hazardous to an operator touching the same.

A further object of the present invention is to provide extrusion apparatus in which either one of the aforementioned air ports in the cover may temporarily be closed by a damper when starting the apparatus into operation and until the extrudable material in the cylinder has reached its proper state of plasticity for extrusion purposes, thereby not only expediting the usual warm-up performance of the apparatus preceding an actual extrusion operation of the same, but achieving this with a minimum of purchased heating medium if such is used for the initial softening of the extrudable mass.

It is a further object of the present invention to provide extrusion apparatus in which the inner surface of the aforementioned cover is polished so as to reflect a maximum of the radiant heat energy from the jacket back against the latter for the initial softening of the extrudable material in the cylinder, during which the latter is usually heated by the aforementioned heating means in the jacket and either or both of the aforementioned ports in the cover are preferably closed to keep the air in the latter more or less static so as least to interfere with the return, by the aforesaid reflection by the inner polished surface of the cover, of radiated heat energy from the jacket back into the latter, thereby further to shorten the unproductive warm-up period of the apparatus preceding an actual extrusion operation of the same.

It is another object of the present invention to provide an extruder in which the aforementioned cover is arranged eccentrically with respect to the cylinder and jacket thereon so that the aforementioned space between jacket and cover gradually decreases in width from the inlet port to the outlet port in the latter, thereby to achieve increasing velocity of the air as it passes upwardly through the space and, hence, a steadily increasing cooling effect of this air on the jacket as it passes in heat-exchange relation with successive portions thereof that are increasingly hotter toward the top.

A further object of the present invention is to provide an extruder in which the rate of heat-exchange between the cooling ribs on the aforementioned jacket and the atmospheric air in the aforementioned space may greatly be increased by forcing the air under pressure through this space.

Another object of the present invention is to provide extrusion apparatus in which circumferentially spaced obstructions are provided in the gap between the aforementioned cooling ribs on the jacket and the surrounding cover, thereby to render the air passing upwardly through the aforementioned space sufficiently turbulent to bring a maximum proportion of this air into direct contact and, hence, most intimate heat-exchange relation with the ribs for their most expeditious and effective cooling by the air.

It is another object of the present invention to provide extrusion apparatus in which the aforementioned obstructions in the gap between the cooling ribs on the jacket and the surrounding cover are in the form of longitudinal baffles or baffle-like formations which are arranged on the inside of the cover so as to direct the air passing upwardly through the aforementioned space in a more or less sinuous path repeatedly between the cooling ribs, thereby to achieve most expeditious and effective cooling of the latter by the air without unduly impeding the flow of this air through the space in the cover.

Further objects and advantages will appear to those skilled in the art from the following, considered in conjunction with the accompanying drawings.

In the accompanying drawings, in which certain modes of carrying out the present invention are shown for illustrative purposes:

Figure 1:
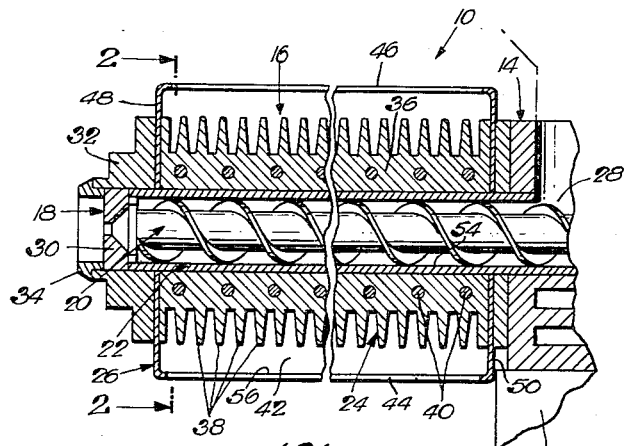
Fig. 1 is a fragmentary longitudinal section through extrusion apparatus embodying the present invention.
Figure 2:
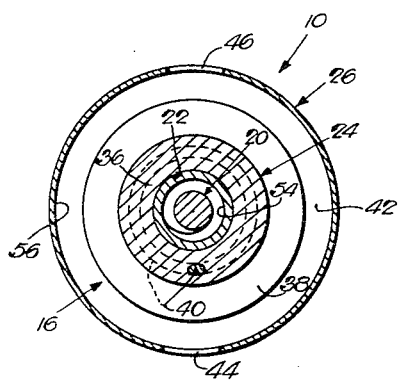
Fig. 2 is a cross-section through the apparatus as taken on the line 2—2 of Fig. 1.

Referring to the drawings, and more particularly to Figs. 1 and 2 thereof, the reference numeral 10 designates extrusion apparatus having a base 12, a hopper 14, a cylinder assembly 16, a die assembly 18, and a feed screw 20.

The hopper 14 serves for the customary introduction of extrudable material in solid form into the cylinder assembly 16. The cylinder assembly comprises, in the present instance, a cylinder or liner 22, a jacket 24 and a cover 26. The cylinder 22 extends rearwardly into the hopper 14 and is in communication therewith as at 28 for the reception of extrudable material therefrom, while the front end of the cylinder 22 carries the die assembly 18. The die assembly 18 comprises an extrusion die 30 in a holder 32 on the cylinder 22, and a die retainer 34 on the holder 32. The feed screw 20 extends substantially throughout the length of the cylinder 22 and is power-driven to advance the extrudable material toward and force it through the extrusion die 30, and also work this material into a plastic state.

The jacket 24 has, in the present instance, a preferably cylindrical body 36 which is suitably mounted on the cylinder 22 so as to be in intimate heat-exchange relation therewith, and formed integrally with the jacket body 36 are a multitude of external cooling ribs 38 which are preferably of the same dimensions. The jacket body 36 is preferably also provided with internal heating means which may be in the form of a spirally arranged electric heating element 40 that may conveniently be cast into the jacket body and be provided outside the latter with suitable terminals (not shown) for connection with a suitable electric power source.

Recourse is usually had to "purchased" heat from the electric heating element 40 in order initially to soften the extrudable material in the cylinder 22 preceding an extrusion operation of the apparatus, for the heat generated by the operating feed screw 20 in the extrudable material is usually insufficient initially to raise the temperature of the latter in the still cold cylinder to the extent of softening this material sufficiently for extrusion purposes. Once the temperature of the extrudable material in the cylinder has been raised to render it sufficiently plastic for extrusion purposes and the cylinder has reached operating temperature, it may well be, especially at modern high-speed operation of the apparatus, that heat from the electric heating element 40 is thereafter no longer required for softening the extrudable material during an operating run of the apparatus, and that artificial cooling of the cylinder may have to be resorted to in order to prevent overheating of the extrudable material merely from being worked by the feed screw. On the other hand the mere working of certain kinds of extrudable materials by the feed screw after their initial softening may be insufficient to generate therein the requisite heat for their continued softening for extrusion, in which case heat from the heating element 40 may be required during an entire extrusion operation of the apparatus. In some instances, simultaneous use of the heating and cooling means during an entire extrusion operation of the apparatus may be advisable in order quickly and accurately to regulate the temperature of the cylinder and prevent undue and lengthy fluctuations thereof.

The jacket 24 is, in the present instance, cooled by atmospheric air which passes through the cover 26 in heat-exchange relation with the cooling ribs 38 on the jacket body 36 and also with the latter. To this end, the cover 26, which in this instance is cylindrical, is spaced peripherally throughout outwardly from the cooling ribs 38 on the jacket body 36 so as to define therebetween a space 42 through which may pass a large volume of air per time unit. The cover 26 is also provided, preferably at its bottom and top, with air inlet and outlet ports 44 and 46, respectively, which preferably extend throughout the longitudinal extent of the cover. The opposite ends 48 and 50 of the cover 26 are closed and may conveniently be interposed between the ends of the jacket 24 and the adjacent die holder 32 and hopper 14, respectively.

As the temperature of the cylinder 22 and jacket 24 rises, atmospheric air will enter the space 42 through the inlet port 44 in the cover 26 and become heated while in heat-exchange relation with the jacket 24, and especially with the cooling ribs 38 thereof. In consequence, the air being heated in the space 42 will constantly rise therein and escape through the outlet port 46 in the cover 26, and this heated air will constantly be replaced by cooler atmospheric air entering through the inlet port 44 in the cover. Hence, while the temperature of the cylinder 22 and jacket 24 is raised, there will be a natural constant upward draft of atmospheric air through the space 42, and this air draft may for some extrusion operations be sufficient to effect the required cooling of the jacket and cylinder, regardless of whether or not simultaneous use is made of the heating element 40.

The heating element 40, by being embedded in the jacket body 36, is in close proximity to and, hence, optimum heat-exchange relation with, the cylinder 22 for immediate and maximum heat transfer from the heating element to the latter. Similarly, the provision of the multitude of cooling ribs 38 on the jacket body 36 makes for optimum heat-exchange between the atmospheric air in the space 42 and the cylinder 22. Furthermore, the provision of the heating element 40 in the jacket body 36 and the further provision of the multitude of external cooling ribs 38 directly on the latter, also makes for optimum heat-exchange between the heating element and cooling ribs. Accordingly, there is achieved with the present arrangement most immediate and maximum temperature response of the inner cylinder surface 54 to heat from the heating element 40 and also to the atmospheric air in the space 42, and also a most effective and quick temperature-modulating effect by either heating or cooling means upon the other and also upon the inner cylinder surface 54. Also, by spacing the cover 26 outwardly from the cooling ribs 38 on the jacket body 36, the space 42 may be such as to permit the passage therethrough of a volume of atmospheric air per time unit which in any event is fully adequate to cool the jacket 24 and cylinder 22 to the required extent, and the surface temperature of the cover is, moreover, so low under any and all operating conditions of the apparatus that an operator touching the cover will not experience even the slightest burning sensation.

Figure 3:
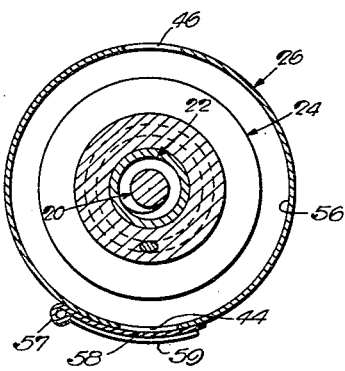
Fig. 3 is a cross-section through extrusion apparatus embodying the present invention in a modified manner.

In order to expedite the initial softening of the extrudable material in the cylinder 22 preceding an extrusion operation of the apparatus, especially if this is accomplished exclusively by, or with the aid of, heat from the heating element 40, the inner surface 56 of the cover 26 is preferably polished so as to reflect radiant heat energy from the jacket 24 back against the latter. In order further to expedite this initial softening of the extrudable material in the cylinder 22, there is preferably provided a damper or dampers for closing either the inlet port 44 or the outlet port 46, or both, and thereby prevent the aforementioned natural draft of atmospheric air through the space 42 and instead compel the air therein to remain relatively static during the warm-up period of the apparatus preceding an extrusion operation of the same. Thus, Fig. 3 shows, by way of example, a damper 58 with which to open and close the air inlet port 44 in the cover 26. The damper 58 may have a handle portion 57 for its convenient manipulation into open or closed position, and may slide in a suitable guideway 59 on the cover 26. Also, if desired, a thermostatically controlled operating mechanism may be provided for the damper 58 in order automatically to achieve correct opening and closing, including partial opening, of the latter as required. In thus closing the inlet port 44, the cover 26 acts much like a hot box and the hot air therein not only expedites the initial warm-up of the apparatus, but permits the transfer of a maximum of the radiant heat energy from the jacket back into the latter if the inner cover surface 56 is polished as aforementioned.

Figure 4:
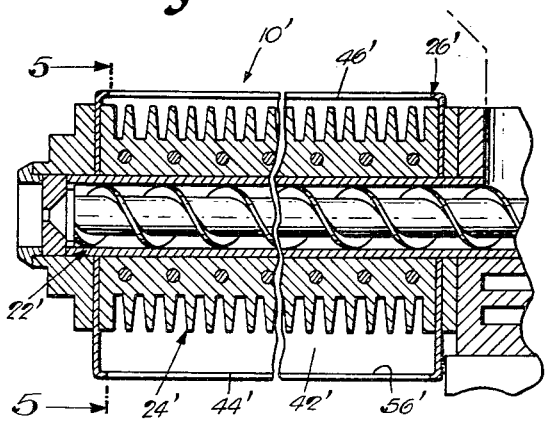
Fig. 4 is a fragmentary longitudinal section through extrusion apparatus embodying the present invention in another modified manner.
Figure 5:
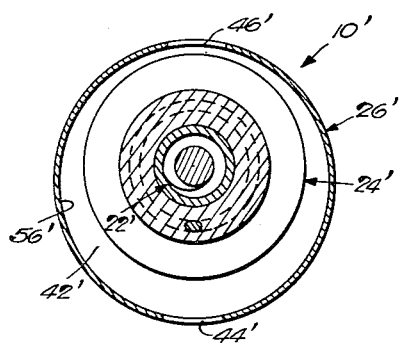
Fig. 5 is a cross-section through the modified extrusion apparatus of Fig. 4, the section being taken on the line 5—5 of Fig. 4.

Reference is now had to Figs. 4 and 5 which show extrusion apparatus 10' that is modified from the described apparatus 10 in that the cover 26' is arranged eccentrically with respect to the common axis of the cylinder 22' and jacket 24', and preferably so that the space 42' between the cover 26' and jacket 24' gradually decreases in width from the air inlet port 44' to the air outlet port 46' in the cover. With this arrangement, the velocity of the atmospheric air passing upwardly through the cover 26' will steadily increase, wherefore this air will have a steadily increasing cooling effect on the jacket as it passes in heat-exchange relation with successive portions thereof that are increasingly hotter toward the top, and thus secure the important advantage of effecting substantially uniform cooling of the jacket and cylinder circumferentially throughout despite the normal greater flow of heat therein toward the top.

As in the case of the previously described extrusion apparatus 10, the inner wall 56' of the cover 26' of the instant modified apparatus 10' may be polished for the reflection of radiant heat energy from the jacket 24' back against the latter in order to shorten the initial warm-up period of the apparatus preceding an extrusion operation of the same, and this initial warm-up period of the apparatus may further be shortened by the provision of a damper or dampers, similar to the damper 58 in Fig. 3, for closing either or both air ports 44' and 46' in the cover 26'.

Figure 6:
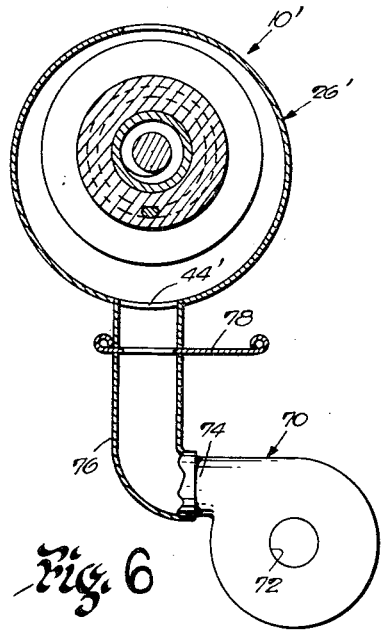
Fig. 6 is a cross-section through extrusion apparatus embodying the present invention in a further modified manner.

For many extrusion operations, natural draft of atmospheric air through the cover of either extrusion apparatus 10 or 10' is insufficient for cooling the extrusion cylinder to the required extent. In that case, recourse may be had to an air blower 70 (Fig. 6) which is power-operated in any suitable manner, and has an air inlet 72 and an air outlet 74 of which the latter is in communication with the inlet port 44' in the cover 26' through a conduit 76. If desired, a damper 78 may be provided in the conduit 76. While Fig. 6 shows the air blower 70 used in conjunction with the modified extrusion apparatus 10', it is, of course, fully within the purview of this invention to use the same or a similar air blower in conjunction with the previously described extrusion apparatus 10 (Fig. 1).

Figure 7:
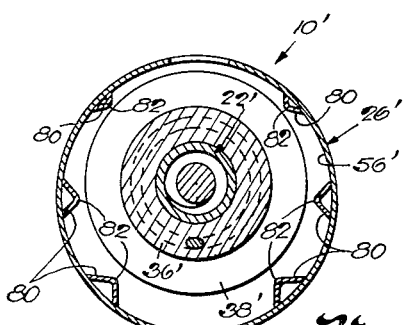
Fig. 7 is a cross-section through extrusion apparatus embodying the present invention in another modified manner.

Reference is now had to Fig. 7 in which the cover 26' of the modified extrusion apparatus 10' is shown provided with internal baffles 80 which are spaced from each other circumferentially of the cover 26' and preferably extend throughout the longitudinal extent of the latter. The baffles 80, which extend inwardly from the inner surface 56' of the cover 26' but are preferably spaced from the adjacent cooling ribs 38' on the jacket body 36', will render the air passing through the cover sufficiently turbulent to bring a maximum proportion of this air into direct contact, and hence most intimate heat-exchange relation, with the ribs 38' for their most expeditious and effective cooling by the air. Preferably, the baffles 80 are V-shaped with their apices 82 extending closest to the adjacent cooling ribs 38', so that these baffles direct the air passing through the cover in a sinuous-like path repeatedly between the cooling ribs 38' and thereby achieve most expeditious and effective cooling of the latter by the air without unduly impeding the flow of this air through the cover. Due to the eccentric arrangement of the cover 26' of the modified extrusion apparatus 10' in Fig. 7, the baffles 80 are preferably of increasing height as they are spaced farther from the top of the cover.

While Fig. 7 shows the provision of the internal baffles 80 in the cover 26' of the modified extrusion apparatus 10', it is, of course, fully within the purview of this invention to provide the same or similar internal baffles in the cover of the previously described extrusion apparatus 10 (Figs. 1 and 2).

Figure 8:
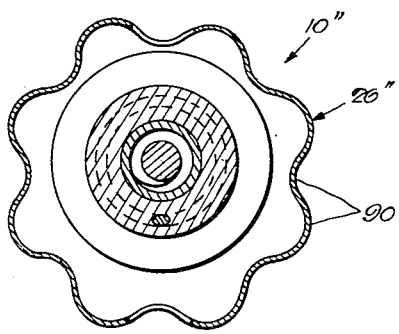
Fig. 8 is a cross-section through extrusion apparatus embodying the present invention in still another modified manner.

Fig. 8 shows a further modified extrusion apparatus 10'' the cover 26'' of which is longitudinally corrugated as at 90 so as to have substantially the same effect as the baffles 80 in Fig. 7 upon the air passing through the cover.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In extrusion apparatus, the combination of a substantially horizontal extrusion cylinder having a surrounding jacket in heat exchange relation therewith and external circumferential cooling ribs on said jacket substantially over the longitudinal extent of the latter; and a cover surrounding said jacket throughout the longitudinal extent of said ribs and being circumferentially spaced throughout from said jacket and ribs to define an air passage around said jacket of a cross-sectional area which substantially decreases progressively from the bottom side to the top side of said cover, said cover having closed ends and two airports extending on said top and bottom sides, respectively, of the cover substantially throughout the longitudinal extent of the latter.

2. The combination in extrusion apparatus as set forth in claim 1, further comprising internal heating means in said jacket.

3. The combination in extrusion apparatus as set forth in claim 1, further comprising a damper operable to open and close one of said ports.

4. The combination in extrusion apparatus as set forth in claim 1, further comprising peripherally spaced longitudinally baffles in said cover extending toward said ribs but spaced therefrom and adapted repeatedly to direct air passing through said cover against said ribs.

5. The combination in extrusion apparatus as set forth in claim 1, in which said cover is longitudinally corrugated so as to direct air passing therethrough in a sinuous path past said ribs.

6. In extrusion apparatus, the combination of a substantially horizontal extrusion cylinder having a surrounding cylindrical jacket body in heat exchange relation therewith and external circumferential cooling ribs on said body substantially over the longitudinal extent of the latter; and a cylindrical cover surrounding said jacket body throughout the longitudinal extent of said ribs and being circumferentially spaced throughout from said jacket body progressively closer from the bottom side of said cover toward the top side thereof, said cover being also spaced from said ribs and having closed ends and two airports extending on said top and bottom sides, respectively, of the cover substantially throughout the longitudinal extent of the latter.

7. In extrusion apparatus, the combination of a substantially horizontal extrusion cylinder having a surrounding cylindrical jacket body in heat exchange relation therewith and external circumferential cooling ribs of substantially uniform height on said body substantially over the longitudinal extent of the latter; and a cylindrical cover surrounding said jacket body substantially throughout the longitudinal extent of said ribs and being arranged eccentrically with respect to said jacket body so as to be spaced progressively closer from said ribs from the bottom side of said cover toward the top side thereof, said cover having closed ends and two airports extending on said top and bottom sides, respectively, of the cover substantially throughout the longitudinal extent of the latter.

References Cited in the file of this patent

UNITED STATES PATENTS

| | | |
|---|---|---|
| 2,171,047 | Richardson et al. | Aug. 29, 1939 |
| 2,541,201 | Buecken | Feb. 13, 1951 |
| 2,574,907 | Bucken | Nov. 13, 1951 |
| 2,721,729 | Van Riper | Oct. 25, 1955 |